United States Patent
Ho et al.

(10) Patent No.: US 10,027,656 B2
(45) Date of Patent: Jul. 17, 2018

(54) SYSTEMS AND METHODS FOR USER ACCOUNT RECOVERY

(71) Applicant: Facebook, Inc., Menlo Park, CA (US)

(72) Inventors: Dustin S. Ho, Palo Alto, CA (US); Dylan Frederick Ladwig, Belmont, CA (US)

(73) Assignee: Facebook, Inc., Menlo Park, CA (US)

( * ) Notice: Subject to any disclaimer, the term of this patent is extended or adjusted under 35 U.S.C. 154(b) by 310 days.

(21) Appl. No.: 14/960,815

(22) Filed: Dec. 7, 2015

(65) Prior Publication Data

US 2017/0163615 A1 Jun. 8, 2017

(51) Int. Cl.
*H04L 29/06* (2006.01)
*H04W 4/21* (2018.01)

(52) U.S. Cl.
CPC .......... *H04L 63/083* (2013.01); *H04W 4/21* (2018.02); *H04L 63/166* (2013.01); *H04L 63/168* (2013.01)

(58) Field of Classification Search
None
See application file for complete search history.

(56) References Cited

U.S. PATENT DOCUMENTS

| | | | | |
|---|---|---|---|---|
| 9,626,725 B2* | 4/2017 | Rubinstein | ............ | G06Q 50/01 |
| 9,727,886 B2* | 8/2017 | Rubinstein | ......... | G06Q 30/0224 |
| 2010/0293600 A1* | 11/2010 | Schechter | ............ | G06F 21/31 726/4 |
| 2012/0011204 A1* | 1/2012 | Morin | .................... | G06Q 10/10 709/205 |
| 2012/0124479 A1* | 5/2012 | Morin | .............. | G06F 17/30905 715/741 |
| 2012/0166533 A1* | 6/2012 | Rubinstein | ......... | G06Q 30/0224 709/204 |
| 2012/0174203 A1* | 7/2012 | Frank | ..................... | G06F 21/31 726/7 |
| 2017/0163471 A1* | 6/2017 | Zheng | .............. | H04L 29/08594 |
| 2017/0195315 A1* | 7/2017 | Rubinstein | ............ | G06Q 50/01 |

* cited by examiner

*Primary Examiner* — Jeffery Williams
(74) *Attorney, Agent, or Firm* — Sheppard Mullin Richter & Hampton LPL (57) ABSTRACT

Systems, methods, and non-transitory computer-readable media can determine a request to recover access to an account of a first user, the request being received from a computing device of a second user. A determination is made that the first user and the second user are recognized as social connections by a social networking system. The first user is authenticated through the computing device of the second user based at least in part on the first user and the second user being recognized as social connections. A login session is established between the computing system and the computing device of the second user upon authenticating the first user.

20 Claims, 7 Drawing Sheets

SYSTEMS AND METHODS FOR USER ACCOUNT RECOVERY

FIELD OF THE INVENTION

The present technology relates to the field of user account recovery. More particularly, the present technology relates to techniques for enabling users to regain access to their accounts.

BACKGROUND

Today, people often utilize computing devices (or systems) for a wide variety of purposes. Users can operate their computing devices to, for example, interact with one another, create content, share content, and access information. In some instances, users can perform various actions through an account provided by a computing platform. For example, a user can log into an email account through an email provider service to send and/or receive emails. In another example, a user can log into a social networking account to access the various features provided by the social networking system. Typically, logging into a service requires the user to provide login credentials (e.g., username and password). In some instances, a user's account may need to be recovered, for example, if the user forgets their login credentials or if such login credentials are modified by a third party, for example.

SUMMARY

Various embodiments of the present disclosure can include systems, methods, and non-transitory computer readable media configured to determine a request to recover access to an account of a first user, the request being received from a computing device of a second user. A determination is made that the first user and the second user are recognized as social connections by a social networking system. The first user is authenticated through the computing device of the second user based at least in part on the first user and the second user being recognized as social connections. A login session is established between the computing system and the computing device of the second user upon authenticating the first user.

In an embodiment, the systems, methods, and non-transitory computer readable media are configured to perform receiving a request to associate a set of credentials with the account of the first user from the computing device of the second user and associating the set of credentials with the account of the first user.

In an embodiment, the systems, methods, and non-transitory computer readable media are configured to perform receiving a request to transfer the login session to a different computing device, providing at least one recovery code to the computing device of the second user, receiving the recovery code from the different computing device, verifying that the recovery code received from the different computing device matches the recovery code provided to the computing device of the second user, and causing the login session to be transferred so that the login session is between the computing system and the different computing device.

In an embodiment, the login session between the computing system and the computing device of the second user is terminated once the login session has been transferred to the different computing device.

In an embodiment, the recovery code is at least one of a text code or a machine-readable code.

In an embodiment, the account of the first user is configured for password-less logins through a computing device of the first user and the computing device of the first user is disassociated from the account of the first user upon transferring the login session to the different computing device.

In an embodiment, the systems, methods, and non-transitory computer readable media are configured to perform determining that a number of login attempts for the first user's account that were made through the computing device of the second user are within a maximum number of login attempts.

In an embodiment, the systems, methods, and non-transitory computer readable media are configured to perform providing a set of icons to be presented through a display screen of the computing device of the second user, receiving a sequence in which icons in the set were selected by a user operating the computing device of the second user, and determining that the sequence satisfies a sequence that was previously specified by the first user.

In an embodiment, the systems, methods, and non-transitory computer readable media are configured to perform determining that the first user has authorized the second user to assist in recovering access to the account of the first user.

In an embodiment, the different computing device is configured to allow access to the login session without requiring a password upon transfer of the login session.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for User Account Recovery

People often use computing devices (or systems) for a wide variety of purposes. People can operate their computing devices to, for example, interact with one another, create content, share content, and access information. In some instances, users can perform various actions through an account provided by a computing platform. For example, a user can log into an email account through an email provider service to send and/or receive emails. In another example, a user can log into a social networking account to access the various features provided by the social networking system. Typically, logging into a service requires the user to provide a set of login credentials (e.g., username and password). In some instances, a user's account may need to be recovered, for example, if the user forgets their login credentials or if such login credentials are modified by an unauthorized third party, for example.

As mentioned, traditional authentication approaches typically require a user to provide a set of credentials (e.g., username and password) that are associated with an account before logging into a computing platform, such as a social networking system. However, such traditional approaches may not be optimal for authenticating certain users, such as users that have difficulty remembering their credentials or users that reside in developing countries. In such instances, these users may benefit from alternative approaches for logging into their accounts. One alternative approach is to permit users to login to their account without providing a password (i.e., password-less logins). In one example, a password-less login may be implemented by tying, or associating, a user login session to one or more authorized user devices that are in the user's possession. While convenient, this approach can be problematic if the user ever loses possession of, or access to, the authorized user device(s). In the event the user does lose possession or access, various user account recovery approaches may be used to help the user regain control of the account. For example, the user may request that a temporary password be sent to the user's e-mail address. This temporary password may be used to authorize a new user device for access the user's account. However, existing approaches for recovering access to a user's account typically require the user to have an alternative means of receiving communications, such as an e-mail address or a phone number.

An improved approach rooted in computer technology overcomes the foregoing and other disadvantages associated with conventional approaches specifically arising in the realm of computer technology. In various embodiments, a user of a social networking system can regain control of the user's account with the help of other users of the social networking system that are social connections of the user. In some instances, a password-less login can be enabled for the user's account, for example, by tying, or associating, the user's account with a first user device of the user. Thus, in this example, the user's account is accessible through the first user device and not through other user devices that are not associated with the user's account. In the event the user loses access to, or possession of, the first user device, the user can initiate recovery of the account through a user device of a social connection, or "friend", of the user. For example, the user can access a user device of the social connection to initiate recovery of the user's account through a software application running on the social connection's user device. Once recovery has initiated, the user can be authenticated through the social connection's user device. The authentication can be done in a number of ways depending on the implementation. In one example, the user may have previously defined a particular sequence for selecting a set of icons, or stickers, for purposes of authentication. In this example, the set of icons can be presented to the user through a display screen of the social connection's user device and the user can authenticate by selecting the icons in the appropriate sequence. Once authenticated, the user is able to access the user's account through a login session established between the social networking system and the social connection's user device. In various embodiments, the user can request that the user's login session be transferred to a second user device that is in the user's possession. In various embodiments, the approaches described herein require that recovery of the user's account be initiated through social connections of the user as recognized by the social networking system. Consequently, by requiring that recovery be initiated through authorized user devices of the user's social connections, the risk of the user's account being compromised is effectively reduced.

Figure 1:
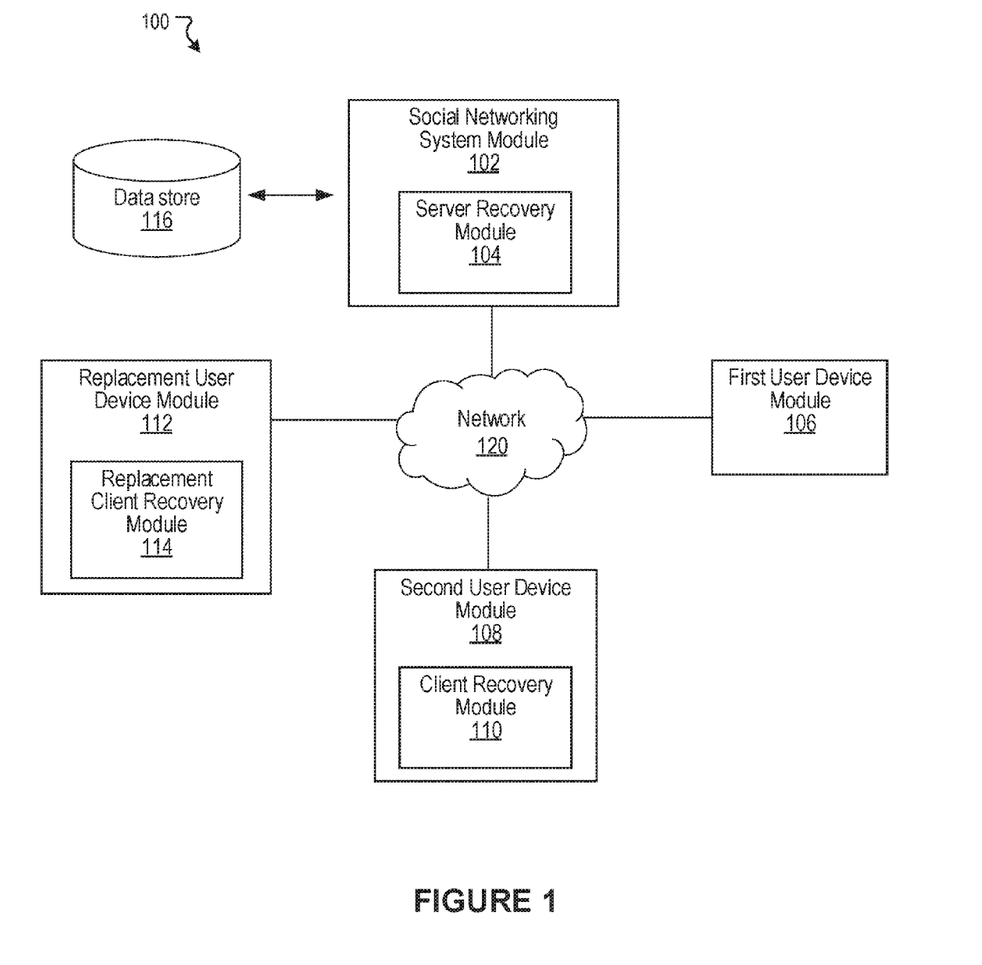
FIG. 1 illustrates an example system for recovering access to a user account in a social networking system through a computing device, according to an embodiment of the present disclosure.

FIG. 1 illustrates an example system 100 for recovering access to a user account in a social networking system through a user device, according to an embodiment of the present disclosure. As shown in the example of FIG. 1, the example system 100 includes a social networking system module 102 that is configured to provide various services (e.g., a social networking platform) that can be accessed by users, for example, over a network 120 (e.g., the Internet). For example, a first user operating a first user device module 106 can access the services provided by the social networking system module 102 by logging into the social networking system using a user account. Typically, a set of credentials (e.g., user name and password) are associated with the user account and these credentials can be used to login to the user account. However, in some embodiments, the first user can enable a password-less login so that the first user is able to login to the account provided by the social networking module 102 through the first user device module 106 without having to provide login credentials. The components (e.g., modules, elements, etc.) shown in this figure and all figures herein are exemplary only, and other implementations may include additional, fewer, integrated, or different components. Some components may not be shown so as not to obscure relevant details.

The example system 100 also includes a second user device module 108 being operated by a second user. In this example, the second user is recognized by the social networking system module 102 as a social connection, or "friend", of the first user. In some embodiments, should the first user lose access to, or possession of, the first user device module 106, the first user can initiate recovery of the first user's account through a social connection. In this example, the first user can initiate recovery of the first user's account through the second user by accessing the second user device module 108. To perform the recovery, the first user, or the second user, can select a recovery option through the second user device module 108. Once the recovery option is selected, a client recovery module 110 can authenticate the first user through the second user device module 108. Once authenticated, the client recovery module 110 can interact with a server recovery module 104 to establish a login session for the first user's account between the social networking system module 102 and the second user device module 108. The first user can then access the first user's account through the second user device module 108 to request recovery of the first user's account. In some embodiments, the first user can transfer the login session between the social networking system module 102 and the second user device module 108 to a replacement user device module 112 that is in the first user's possession. For example, a replacement client recovery module 114 in the replacement user device module 112 can be used to facilitate the session transfer. Once transferred, the login session exists between the social networking system module 102 and the replacement user device module 112, and the existing login session associated with the first user's account between the social networking system module 102 and the second user device module 108 is terminated. More details regarding the client recovery module 110, the server recovery module 104, and the replacement client recovery module 114 will be provided in reference to FIGS. 2, 3 and 4, respectively.

In some embodiments, the social networking system module 102, the first user device module 104, the second user device module 108, and the replacement user device module 112 can each be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the social networking system module 102, the first user device module 104, the second user device module 108, and the replacement user device module 112 can each be implemented, in part or in whole, as software running on one or more computing devices or systems, such as on a user computing device or client computing system. For example, the first user device module 104, the second user device module 108, and the replacement user device module 112 may be each implemented as an application (e.g., app), a program, an applet, in a web browser, etc., running on a user computing device or a client computing system, such as the user device 610 of FIG. 6. Further, the social networking system module 102, or at least a respective portion thereof, can be implemented using one or more computing devices or systems that include one or more servers, such as network servers or cloud servers. In some instances, the social networking system module 102 can, in part or in whole, be implemented within or configured to operate in conjunction with a social networking system (or service), such as the social networking system 630 of FIG. 6. It should be understood that there can be many variations or other possibilities.

In some embodiments, the social networking system module 102 can be configured to communicate and/or operate with the at least one data store 116 in the example system 100. The at least one data store 116 can be configured to store and maintain various types of data. In various embodiments, the at least one data store 116 can store data relevant to function and operation of the social networking system module 102, such as credentials (e.g., username and password) for various user accounts that are registered through the social networking system module 102 and/or information identifying respective user devices that have been associated with any accounts that are configured for password-less logins. In some implementations, the at least one data store 116 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 116 can store information associated with users, such as user identifiers, user information, profile information, user specified settings, content produced or posted by users, and various other types of user data. It should be appreciated that there can be many variations or other possibilities.

Figure 2:
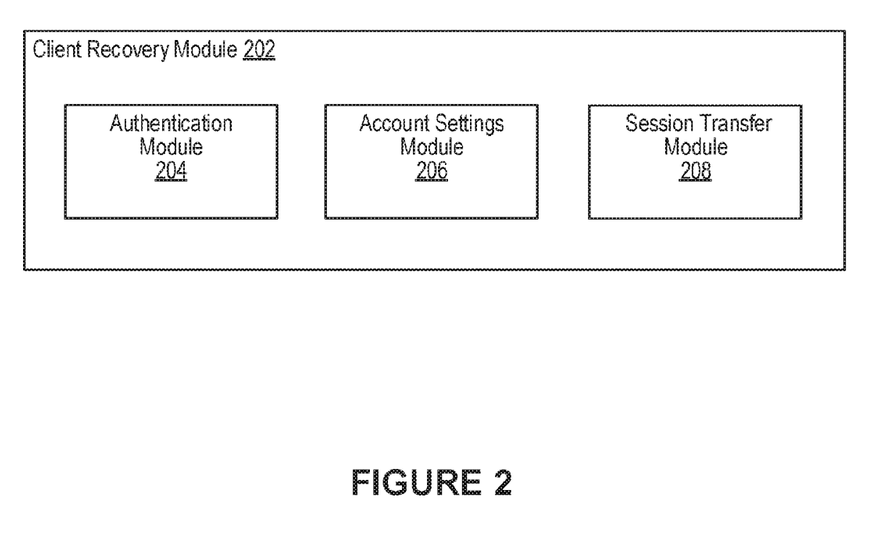
FIG. 2 illustrates an example of a client recovery module configured to recover access to a user account, according to an embodiment of the present disclosure.

FIG. 2 illustrates an example of a client recovery module 202 configured to recover access to a user account, according to an embodiment of the present disclosure. In some embodiments, the client recovery module 110 of FIG. 1 can be implemented as the client recovery module 202. As shown in FIG. 2, the client recovery module 202 can include an authentication module 204, an account settings module 206, and a session transfer module 208.

As mentioned, in some instances, a first user's account in a social networking system may be configured for password-less logins. In such instances, the first user's account is typically associated with a user device of the first user. In some embodiments, if the first user loses access to, or possession of, the user device, then the first user can initiate recovery of the account through a user device of a second user who is recognized by the social networking system as a social connection, or "friend", of the first user. In one example, the first user, or the second user, can initiate recovery by selecting a recovery option through a software application (e.g., social networking application) running on the user device of the second user. Once the option is selected, the authentication module 204 can attempt to authenticate the first user. The first user can be authenticated in a various ways depending on the implementation. In some embodiments, the first user can input a set of credentials (e.g., username and password, a secret passcode, etc.) through the user device and this input can be authenticated by the authentication module 204. In some embodiments, the user may have previously defined a particular sequence, or order, for selecting a set of icons, or stickers, for purposes of authentication. In this example, the authentication module 204 can present a set of icons through a display screen of the user device of the second user and the first user can authenticate by selecting the icons in the appropriate sequence. In various embodiments, the authentication module 204 can interact with an authentication module implemented in the social networking system to complete the authentication process, as described in reference to FIG. 3.

When authenticating the first user, the authentication module 204 can also be configured to determine whether the second user whose user device is being used to initiate the recovery is indeed a social connection of the first user. This determination may be performed in various ways depending on the implementation. For example, in some embodiments, the identity of the second user is known due to the second user being logged in to the second user's account through the software application running on the user device of the second user. In such embodiments, the authentication module 204 can interact with the social networking system that provides the respective accounts for the first user and the second user to determine whether the two users are social connections. In some embodiments, a user can specify which social connections of the user can facilitate recovery of the user's account. For example, a user can specify that recovery of the user's account may be performed using the respective computing devices of social connections user A, user B, and user C. In this example, a user D, who is a social connection of the user, would not be permitted to access the user's account through a computing device associated with the user D. In some embodiments, the user can specify which social connections of the user are banned from facilitating recovery of the user's account. For example, a user can specify that recovery of the user's account may not be performed using the respective computing devices of social connections user E and user F. In this example, the users E and F, despite being social connections of the user, would not be permitted to access the user's account through any computing devices that are associated with the users E and F.

In some embodiments, the authentication module 204 is configured to allow a set number of login attempts to the first user's account from a social connection's user device. For example, a user may be given three attempts to log in to the first user's account from the user device of the second user. If the user does not authenticate within the three attempts, then the user device of the second user can be locked, or prevented, from any further attempts to login to the first user's account either permanently or for some period of time. In such instances, the first user may need to perform the account recovery using a user device of a different social connection. This approach provides an additional safeguard against unauthorized access to the first user's account by a malicious social connection (e.g., the second user).

Once authenticated, a login session to the first user's account is established between the social networking system and the user device of the second user. While logged in, the first user can modify account settings through the account settings module 206. In some embodiments, the first user can configure the first user's account to require a set of credentials (e.g., username and password) for authentication purposes. In other words, the first user can configure the account to require login credentials in lieu of password-less logins. In such embodiments, the account settings module 206 can provide an interface on the display screen of the user device of the second user through which the first user can provide the login credentials to be associated with the first user's account. The account settings module 206 can communicate with the social networking system to implement the desired changes to the first user's account and to associate the login credentials provided by the first user with the first user's account. In some embodiments, the first user can request transfer of the login session to a different, or replacement, user device through the session transfer module 208. For example, the first user may have purchased or obtained a new user device to replace the user device to which the first user previously lost access or possession. In such embodiments, the session transfer module 208 can interact with the social networking system to cause the first user's login session to be transferred from the user device of the second user to the replacement user device. The session transfer may be performed using any generally known approaches for transferring a login session. In some embodiments, a session transfer module implemented in the social networking can provide recovery codes that can be inputted into the replacement user device to cause the login session to be transferred to the replacement user device. For example, the recovery codes may include an alphanumeric code that can be entered into the replacement user device to cause the login session to be transferred to the replacement user device. In another example, the recovery code may be a machine-readable code (e.g., Quick Response Code) that is presented on the display screen of the user device of the second user. This machine-readable code can be scanned or captured using the replacement user device to cause the login session to be transferred to the replacement user device. In various embodiments, the login session between the social networking system and the user device of the second user is terminated once the login session is successfully transferred to the replacement user device.

Figure 3:
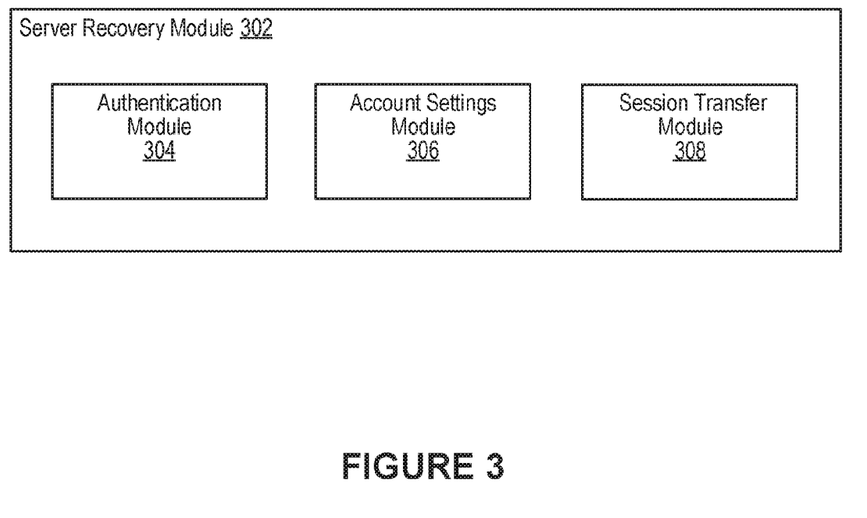
FIG. 3 illustrates an example of a server recovery module configured to recover access to a user account, according to an embodiment of the present disclosure.

FIG. 3 illustrates an example of a server recovery module 302 configured to recover access to a user account, according to an embodiment of the present disclosure. In some embodiments, the server recovery module 104 of FIG. 1 can be implemented as the server recovery module 302. As shown in FIG. 3, the server recovery module 302 can include an authentication module 304, an account settings module 306, and a session transfer module 308.

As described above, in some instances, a first user can initiate recovery of the first user's account through a user device of a second user who is social connection, or "friend", of the first user. Upon initiating the recovery process, an authentication module implemented in the user device of the second user can attempt to authenticate the first user using various approaches. In some embodiments, any authentication information provided by the first user to the authentication module implemented in the user device of the second user can be sent to the authentication module 304. In such embodiments, the authentication module 304 can determine whether the authentication information provided by the first user matches the authentication information corresponding to the first user's account. The authentication information corresponding to the first user's account may be accessible through a data store, such as the data store 116, as described in reference to FIG. 1. For example, the authentication information may include a set of credentials and/or a particular sequence for selecting a set of icons, or stickers, for purposes of authentication. In some instances, the authentication information may include one or more recovery codes that were generated by the session transfer module 308 for purposes of transferring a user's login session to the user device. In such instances, the authentication module 304 can verify that the recovery code provided to the authentication module 304 corresponds to a recovery code that was generated by the session transfer module 308 for purposes of completing the session transfer of the user's login session.

The account settings module 306 can be configured to modify settings for user accounts. For example, once logged into a user device, the first user can modify account settings through an account settings module implemented in the user device. In this example, the account settings module in the user device can communicate with the account settings module 306 to implement the requested changes to the first user's account. For example, the first user can request that the first user's account allow password-less logins or, alternatively, request that the first user's account require a set of credentials (e.g., username and password) for authentication purposes. Such requests for modifying the first user's account can be received and implemented by the account settings module 306. In instances where the first user is associating a set of credentials with the first user's account, the account settings module 306 can receive and associate the set of credentials with the first user's account.

As discussed, in some embodiments, the first user can request that a login session established between the server recovery module 302 and an originating user device (e.g., user device of the second user) be transferred to a different, or replacement, user device that is accessible to the first user. In such embodiments, the session transfer module 308 can facilitate the transfer of the first user's login session from the originating user device to the replacement user device. For example, the session transfer module 308 can generate and provide a recovery code to the originating user device from which the login session is to be transferred. The first user can obtain this recovery code from the originating user device and provide the recovery code to the replacement user device to cause the login session to be transferred, as described in reference to FIG. 4.

Figure 4:
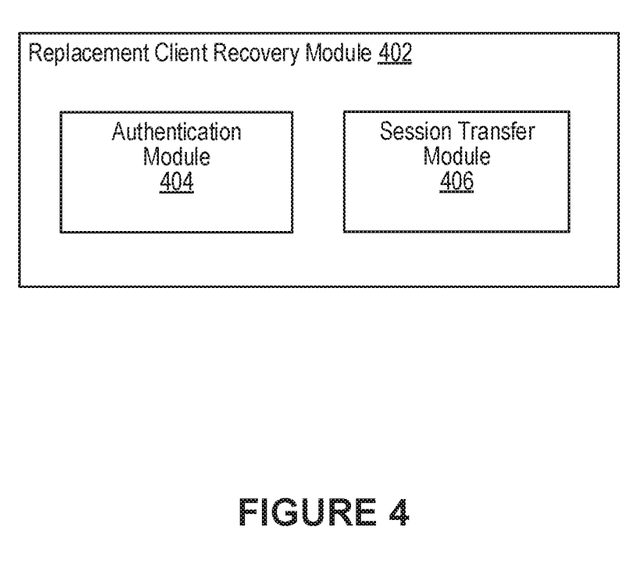
FIG. 4 illustrates an example of a replacement client recovery module configured to recover access to a user account, according to an embodiment of the present disclosure.

FIG. 4 illustrates an example of a replacement client recovery module configured to recover access to a user account, according to an embodiment of the present disclosure. In some embodiments, the replacement client recovery module 114 of FIG. 1 can be implemented as the replacement client recovery module 402. As shown in FIG. 4, the replacement client recovery module 302 can include an authentication module 404 and a session transfer module 406. In this example, the replacement client recovery module 402 can be implemented in a replacement user device to which a first user's login session between a social networking system and an originating user device (e.g., user device of a second) is to be transferred.

A first user can request that a login session established between the social networking system and the originating user device (e.g., user device of a second user) be transferred to a different, or replacement, user device that is accessible to the first user. In such embodiments, the replacement client recovery module 402 can facilitate the transfer of the first user's login session from the originating user device to the replacement user device. For example, an authentication module 404 can be configured to validate any recovery codes that were provided by the social networking system for purposes of initiating the session transfer. The first user can provide the recovery codes (e.g., a text code comprising a string of characters which may include punctuation and/or mathematical symbols, machine-readable codes, etc.) to the authentication module 404 and the authentication module 404 can communicate the recovery codes to the social networking system for validation. In one example, the first user can input an alphanumeric code to the authentication module 404 by interacting with software (e.g., a social networking application) running on the replacement user device. In this example, the authentication module 404 can provide the alphanumeric code to the social networking system for validation. In another example, the first user can capture an image of a machine-readable code using the replacement user device and this image can be provided to software (e.g., a social networking application) running on the replacement user device. In this example, the authentication module 404 can provide the image of the machine-readable code to the social networking system for validation. Once the authentication module 404 determines that the recovery code provided by the first user is valid, for example, based on receiving a confirmation from the social networking system, then the session transfer module 406 can communicate with the social networking system to transfer the first user's login session to the replacement client recovery module 402.

Figure 5:
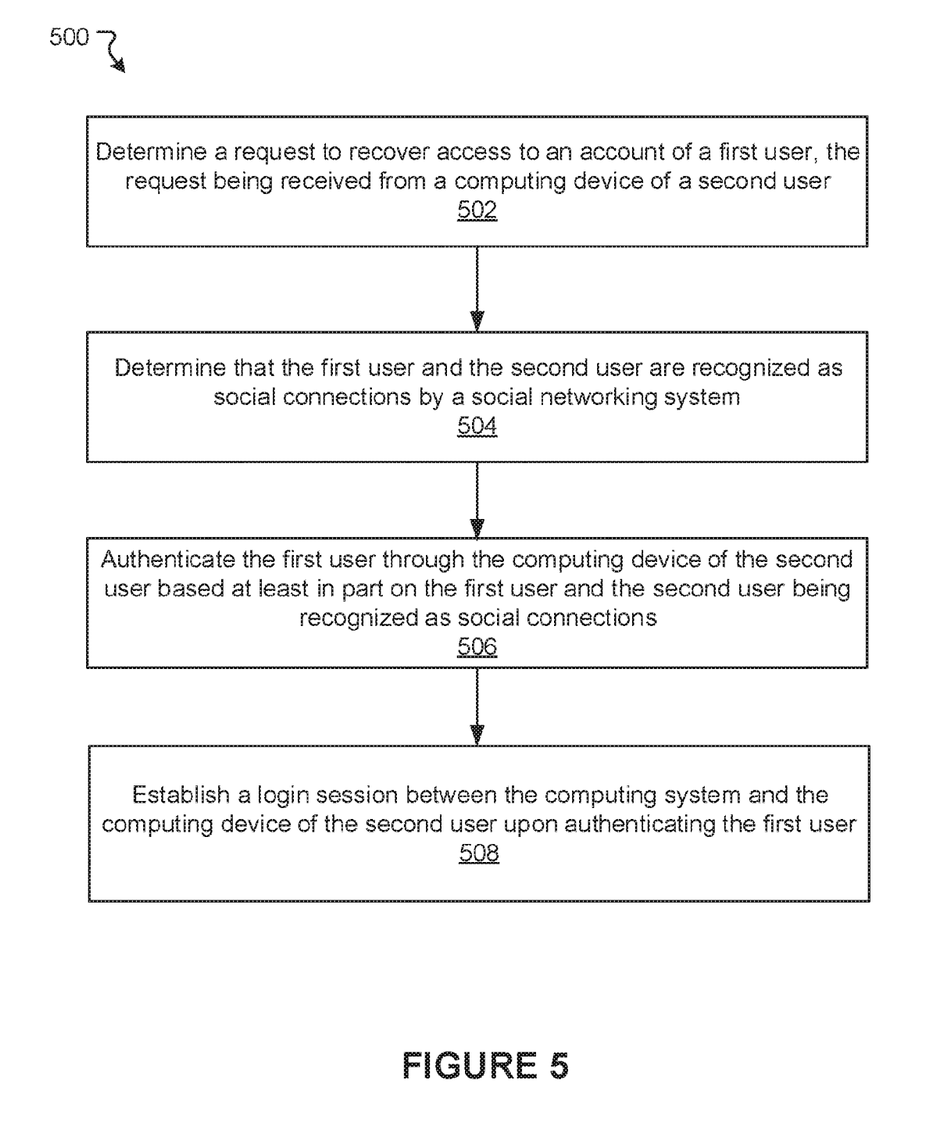
FIG. 5 illustrates an example process for recovering access to a user account, according to various embodiments of the present disclosure.

FIG. 5 illustrates an example process for recovering access to a user account, according to various embodiments of the present disclosure. It should be appreciated that there can be additional, fewer, or alternative steps performed in similar or alternative orders, or in parallel, within the scope of the various embodiments discussed herein unless otherwise stated. At block 502, a determination is made of a request to recover access to an account of a first user, the request being received from a computing device of a second user. At block 504, a determination is made that the first user and the second user are recognized as social connections by a social networking system. At block 506, the first user is authenticated through the computing device of the second user based at least in part on the first user and the second user being recognized as social connections. At block 508, a login session is established between the computing system and the computing device of the second user upon authenticating the first user.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
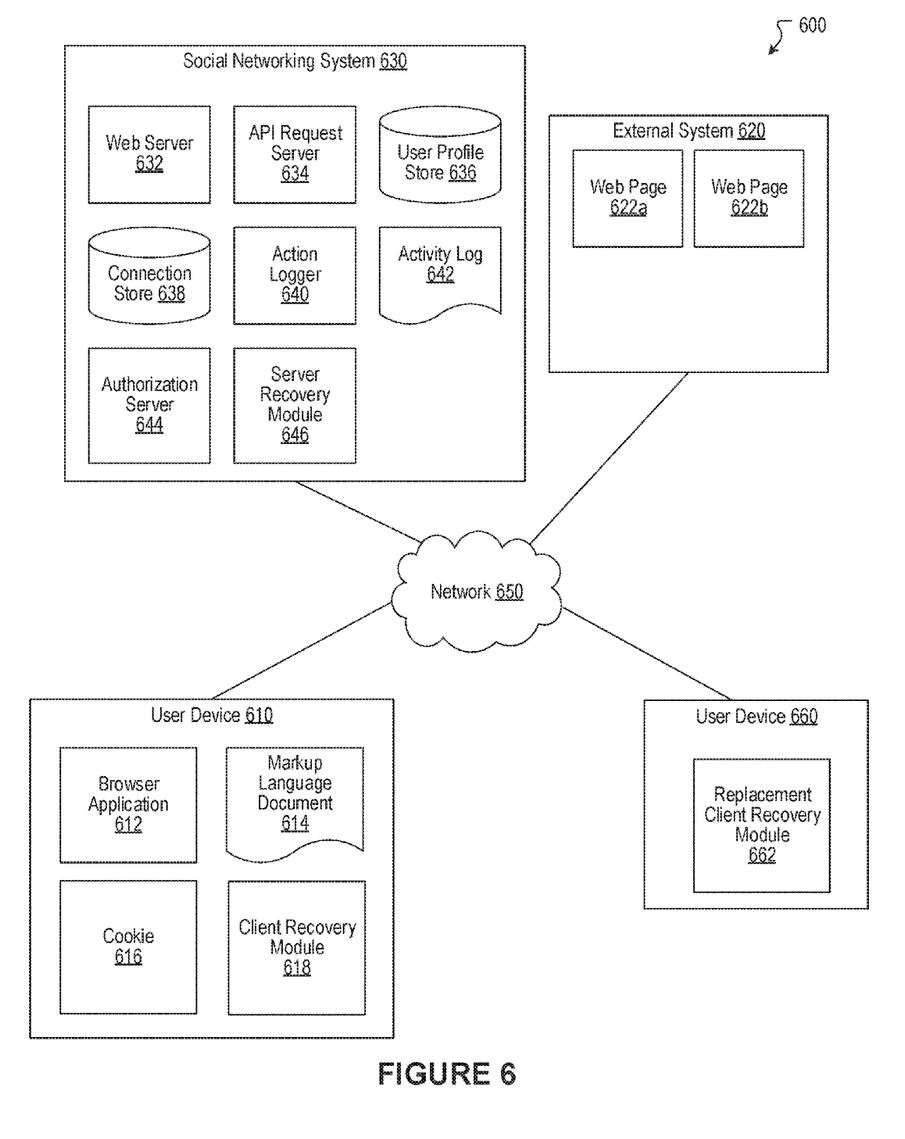
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include an server recovery module 646. The server recovery module 646 can, for example, be implemented as the server recovery module 104 of FIG. 1. The user device 610 can include a client recovery module 618. The client recovery module 618 can, for example, be implemented as the client recovery module 110 of FIG. 1. The user device 660 may be configured to provide some, or all, of the functionalities described with respect to the user device 610. Further, the user device 660 can include a replacement client recovery module 662. The replacement client recovery module 662 can, for example, be implemented as the replacement client recovery module 114 of FIG. 1. As discussed previously, it should be appreciated that there can be many variations or other possibilities.

Hardware Implementation

Figure 7:
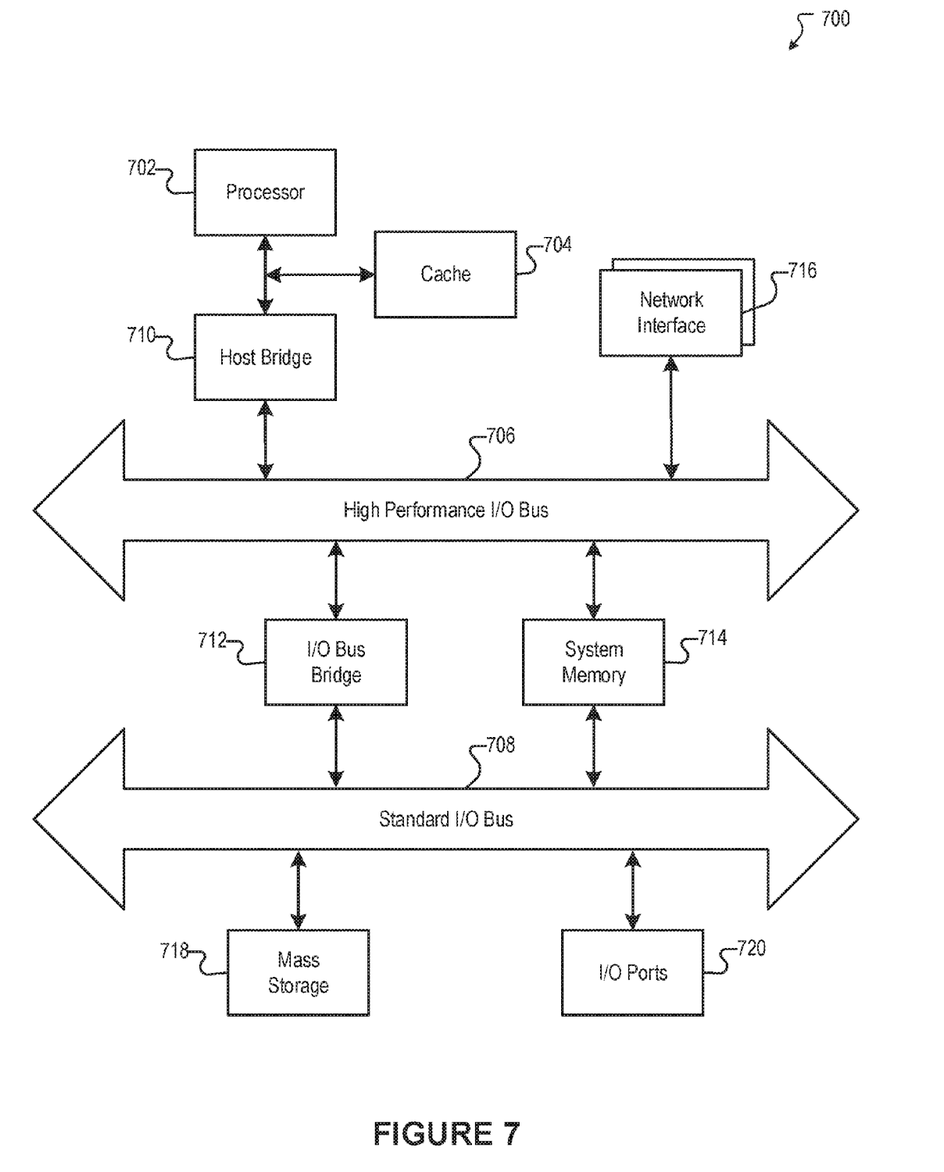
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing system, a request to recover access to an account of a first user, the request being received from a computing device of a second user, wherein the first user is different from the second user;
   determining, by the computing system, that the first user and the second user are recognized as social connections by a social networking system;
   authenticating, by the computing system, the first user through the computing device of the second user based at least in part on the first user and the second user being recognized as social connections; and
   establishing, by the computing system, a login session between the computing system and the computing device of the second user upon authenticating the first user.

2. The computer-implemented method of claim 1, the method further comprising:
   receiving, by the computing system, a request to associate a set of credentials with the account of the first user from the computing device of the second user; and
   associating, by the computing system, the set of credentials with the account of the first user.

3. The computer-implemented method of claim 1, the method further comprising:
   receiving, by the computing system, a request to transfer the login session to a different computing device;
   providing, by the computing system, at least one recovery code to the computing device of the second user;
   receiving, by the computing system, the recovery code from the different computing device;
   verifying, by the computing system, that the recovery code received from the different computing device matches the recovery code provided to the computing device of the second user; and
   causing, by the computing system, the login session to be transferred so that the login session is between the computing system and the different computing device.

4. The computer-implemented method of claim 3, wherein the login session between the computing system and the computing device of the second user is terminated once the login session has been transferred to the different computing device.

5. The computer-implemented method of claim 3, wherein the recovery code is at least one of a text code or a machine-readable code.

6. The computer-implemented method of claim 3, wherein the account of the first user is configured for password-less logins through a computing device of the first user, the method further comprising:
causing, by the computing system, the computing device of the first user to be disassociated from the account of the first user upon transferring the login session to the different computing device.

7. The computer-implemented method of claim 1, wherein authenticating the first user through the computing device of the second user further comprises:
determining, by the computing system, that a number of login attempts for the first user's account that were made through the computing device of the second user are within a maximum number of login attempts.

8. The computer-implemented method of claim 1, wherein authenticating the first user through the computing device of the second user further comprises:
providing, by the computing system, a set of icons to be presented through a display screen of the computing device of the second user;
receiving, by the computing system, a sequence in which icons in the set were selected by a user operating the computing device of the second user; and
determining, by the computing system, that the sequence satisfies a sequence that was previously specified by the first user.

9. The computer-implemented method of claim 1, wherein determining that the first user and the second user are recognized as social connections further comprises:
determining, by the computing system, that the first user has authorized the second user to assist in recovering access to the account of the first user.

10. The computer-implemented method of claim 1, wherein the different computing device is configured to allow access to the login session without requiring a password upon transfer of the login session.

11. A system comprising:
at least one processor; and
a memory storing instructions that, when executed by the at least one processor, cause the system to perform:
determining a request to recover access to an account of a first user, the request being received from a computing device of a second user, wherein the first user is different from the second user;
determining that the first user and the second user are recognized as social connections by a social networking system;
authenticating the first user through the computing device of the second user based at least in part on the first user and the second user being recognized as social connections; and
establishing a login session between the computing system and the computing device of the second user upon authenticating the first user.

12. The system of claim 11, wherein the system further performs:
receiving a request to associate a set of credentials with the account of the first user from the computing device of the second user; and
associating the set of credentials with the account of the first user.

13. The system of claim 11, wherein the system further performs:
receiving a request to transfer the login session to a different computing device;
providing at least one recovery code to the computing device of the second user;
receiving the recovery code from the different computing device;
verifying that the recovery code received from the different computing device matches the recovery code provided to the computing device of the second user; and
causing the login session to be transferred so that the login session is between the computing system and the different computing device.

14. The system of claim 13, wherein the login session between the computing system and the computing device of the second user is terminated once the login session has been transferred to the different computing device.

15. The system of claim 13, wherein the recovery code is at least one of a text code or a machine-readable code.

16. A non-transitory computer-readable storage medium including instructions that, when executed by at least one processor of a computing system, cause the computing system to perform a method comprising:
determining a request to recover access to an account of a first user, the request being received from a computing device of a second user, wherein the first user is different from the second user;
determining that the first user and the second user are recognized as social connections by a social networking system;
authenticating the first user through the computing device of the second user based at least in part on the first user and the second user being recognized as social connections; and
establishing a login session between the computing system and the computing device of the second user upon authenticating the first user.

17. The non-transitory computer-readable storage medium of claim 16, wherein the computing system further performs:
receiving a request to associate a set of credentials with the account of the first user from the computing device of the second user; and
associating the set of credentials with the account of the first user.

18. The non-transitory computer-readable storage medium of claim 16, wherein the computing system further performs:
receiving a request to transfer the login session to a different computing device;
providing at least one recovery code to the computing device of the second user;
receiving the recovery code from the different computing device;
verifying that the recovery code received from the different computing device matches the recovery code provided to the computing device of the second user; and
causing the login session to be transferred so that the login session is between the computing system and the different computing device.

19. The non-transitory computer-readable storage medium of claim 18, wherein the login session between the computing system and the computing device of the second user is terminated once the login session has been transferred to the different computing device.

20. The non-transitory computer-readable storage medium of claim 18,
wherein the recovery code is at least one of a text code or a machine-readable code.

\* \* \* \* \*